US010112529B2

(12) United States Patent
Gurunathan

(10) Patent No.: US 10,112,529 B2
(45) Date of Patent: Oct. 30, 2018

(54) ELECTRONIC SAFETY SYSTEM FOR A VEHICLE

(71) Applicant: MasterCard International Incorporated, Purchase, NY (US)

(72) Inventor: Arunmurthy Gurunathan, Pune (IN)

(73) Assignee: Mastercard International Incorporated, Purchase, NY (US)

(*) Notice: Subject to any disclaimer, the term of this patent is extended or adjusted under 35 U.S.C. 154(b) by 51 days.

(21) Appl. No.: 15/342,708

(22) Filed: Nov. 3, 2016

(65) Prior Publication Data

US 2017/0136943 A1 May 18, 2017

(30) Foreign Application Priority Data

Nov. 13, 2015 (SG) .............. 10201509383S

(51) Int. Cl.
*B60Q 1/00* (2006.01)
*B60Q 1/52* (2006.01)
*G08B 27/00* (2006.01)
*G08B 25/01* (2006.01)
*G08B 25/08* (2006.01)
*G08G 1/00* (2006.01)
*B60R 25/10* (2013.01)
*G01M 17/00* (2006.01)
*G01C 22/00* (2006.01)

(52) U.S. Cl.
CPC .............. *B60Q 1/52* (2013.01); *G08B 25/016* (2013.01); *G08B 25/08* (2013.01); *G08B 27/001* (2013.01); *G08G 1/205* (2013.01)

(58) Field of Classification Search
CPC ........ B60Q 1/52; G08B 25/016; G08B 25/08; G08B 27/001; G08G 1/205
USPC ...................................... 340/425.5
See application file for complete search history.

(56) References Cited

U.S. PATENT DOCUMENTS

| 2011/0140871 | A1* | 6/2011 | Christensen | B60R 25/04 340/426.11 |
| 2013/0285855 | A1* | 10/2013 | Dupray | G01S 19/48 342/451 |
| 2016/0071418 | A1* | 3/2016 | Oshida | G08G 1/22 701/23 |
| 2016/0086391 | A1* | 3/2016 | Ricci | G07C 5/008 701/29.3 |
| 2016/0171574 | A1* | 6/2016 | Paulucci | G07B 15/02 705/13 |

\* cited by examiner

*Primary Examiner* — Jack K Wang
(74) *Attorney, Agent, or Firm* — Buckley, Maschoff & Talwalkar LLC

(57) ABSTRACT

An electronic safety system on a vehicle comprising a positioning unit configured to determine a geographic location of the vehicle; a sensor unit configured to detect a distress signal; and a telecommunication unit coupleable to the positioning unit and the sensor unit; wherein the telecommunication unit is configured to transmit an alert notification to an emergency service organization in response to the detected distress signal; the alert notification including the determined geographic location of the vehicle. A vehicle having the electronic safety system and a method of generating an alert notification are also disclosed.

21 Claims, 4 Drawing Sheets

ELECTRONIC SAFETY SYSTEM FOR A VEHICLE

CROSS-REFERENCE TO RELATED APPLICATION

This application is a U.S. National Stage filing under 35 U.S.C. § 119, based on and claiming benefit of and priority to SG Patent Application No. 102015093835 filed Nov. 13, 2015.

FIELD AND BACKGROUND

An electronic safety system for a vehicle is disclosed. In particular, a device and method for generating alert notifications on board of the vehicle is disclosed. For example, the vehicle may be, but is not limited to, a vehicle for hire.

Vehicles for hire (typically with a driver) such as taxicabs are a commonly-used mode of transportation. Unlike public transport systems such as buses or the subway, a vehicle for hire offers a private ride (i.e. not shared by strangers without any private arrangement). This usually offers greater flexibility for passengers in terms of the pick-up and drop-off locations and travelling hours compared to public transport systems. Due to the non-shared ride offered by vehicles for hire, a passenger may enjoy more privacy and convenience as a result. However, this also poses security and safety risks to the passengers and/or drivers. Since they are confined within a private space within the vehicle, their accessibility to assistance in a timely manner in case of an emergency may be limited. For example, there may be safety concerns for a lady traveller who notices an abnormal behaviour of the driver while she is on board.

Therefore, it would be desirable to provide a safety system and method for use with a hired vehicle to address the above concerns.

SUMMARY

In general terms, the present disclosure provides an electronic safety system which generates an alert notification including a geographic location of a vehicle and transmits it to an emergency service organization, in response to a detected distress signal. This allows a safety alert to be generated conveniently so that the emergency service organization is timely notified of the location of the vehicle in case of an emergency. For example, the alert notification may be a rescue request for immediate assistance by the emergency service organization.

According to a first expression, there is provided an electronic safety system for a vehicle comprising:
a positioning unit configured to determine a geographic location of the vehicle;
a sensor unit configured to detect a distress signal; and
a telecommunication unit coupleable to the positioning unit and the sensor unit; wherein the telecommunication unit is configured to transmit an alert notification to an emergency service organization in response to the detected distress signal; the alert notification including the determined geographic location of the vehicle.

The provision of the sensor unit allows a distress signal to be detected, which is typically indicative of an emergency situation encountered by the passengers, the driver and/or the vehicle. In response to the detected distress signal, the telecommunication unit of the safety system transmits the geographic location of the vehicle detected by the positioning unit to the emergency service organization, thereby alerting them of the emergency as well as the location. This may allow an emergency situation associated with the vehicle and its location to be communicated to the emergency service organization in real time upon a detection of a distress signal. In other words, this does not requiring manual generation or transmission of the alert notification by the passengers and/or the driver.

In some embodiments, the telecommunication unit may be configured to transmit the alert notification to a corresponding emergency service organization based on a type of the distress signal. This allows the most relevant type of emergency service organizations to be notified to handle a corresponding type of emergency effectively and efficiently.

In some embodiments, the sensor unit comprises a passenger sensor configured to detect an input from a passenger indicative of an emergency situation. In another example, there is a plurality of passenger sensors.

In some embodiments, the passenger sensor is coupleable to the telecommunication unit via a wireless communication protocol. This allows for greater flexibility in placing the passenger sensor at various locations in the interior of the vehicle. For example, at least one passenger sensor may be provided in the vicinity of rear seats of the vehicle to be accessible by a passenger seated at the rear.

In some embodiments, the telecommunication unit is operable to transmit an updated location of the vehicle determined by the positioning unit. This allows the location of the vehicle to be monitored by the emergency service organization. Thus, any emergency assistance such as rescue operations deployed may track and locate the vehicle in real time.

In some embodiments, the sensor unit comprises a pressure sensor configured to determine an impact associated with the vehicle. For example, a distress signal may be indicative of an impact above an impact limit and in response the telecommunication unit transmits the alert notification to an emergency medical service provider, such as a hospital or an Accident and Emergency (A&E) department of a hospital.

In some embodiments, the sensor unit comprises a temperature sensor to detect a temperature of the vehicle. For example, the distress signal may be indicative of a temperature above a temperature limit caused by a fire hazard or potential fire hazard. In response, the telecommunication unit transmits the alert notification to a civil defense department for deployment of rescue forces such as fire engines and/or medical ambulances.

In some embodiments, the telecommunication unit is configured to transmit the alert notification to an emergency service organization selected based on the determined geographic location of the vehicle. For example, the emergency service organization nearest to the determined geographic location may be selected for the transmission of the alert notification.

In some embodiments, the alert notification comprises an identity of the vehicle. This helps the emergency service organization identify the target of rescue swiftly.

In some embodiments, a trip management unit may be provided that is configured to receive journey details associated with a trip booking of the vehicle, said journey details including an identity of a passenger. This not only provides the additional functionality of managing trip bookings by the passengers when used with a hired vehicle, but also allows the passenger information obtained (such as the identity of the passenger) to be included in the alert notification in case of an emergency.

In some embodiments, the emergency service organization is a police force.

In some embodiments, the electronic safety system further has a fare calculator configured to determine a fare of a trip. For example, the electronic safety system may be integrated to a taximeter for use with a taxicab.

In some embodiments, the telecommunication unit is configured to receive a payment request for paying the fare over a payment network.

In some embodiments, the telecommunication unit is configured to receive an authentication request to cause the payment to be authorized.

In some embodiments, the alert notification may comprise a rescue request for immediate assistance by the emergency service organization.

According to a second expression, there is provided an electronic safety system for a vehicle. The electronic safety system has a computer processor and a data storage device, the data storage device storing non-transitory instructions operative by the processor to:
receive a geographic location of the vehicle from a positioning unit;
receive data representing a distress signal from a sensor unit;
generate an alert notification including the geographic location of the vehicle; and
cause the alert notification to be transmitted, by a telecommunication unit to an emergency service organization in response to the distress signal.

According to a third expression, there is provided a vehicle having an electronic safety system as described above installed onboard.

In some embodiments, the electronic safety system is mounted on a dashboard of the vehicle. For example, the electronic safety system is configured to couple to a speed sensor of the vehicle thereby enables distance travelled by the vehicle and/or a fare associated with the trip to be determined.

In some embodiments, the sensor unit comprises one or more passenger sensors configured to detect an input from a passenger indicative of an emergency situation. In a particular example, at least one of the one or more passenger sensors is configured to be accessible to a passenger at a rear passenger seat.

According to another expression, there is provided a method of generating an alert notification via a vehicle, said vehicle having a positioning unit and a sensor unit coupled to a telecommunication unit, the method comprising:
determining, by the positioning unit, a geographic location of the vehicle;
detecting, by the sensor unit, a distress signal;
generating an alert notification including the geographic location of the vehicle; and
transmitting, by the telecommunication unit, the alert notification to an emergency service organization in response to the distress signal.

In some embodiments, the method may comprise transmitting the alert notification to a corresponding emergency service organization based on a type of the distress signal.

In some embodiments, the method may comprise detecting an input from a passenger indicative of an emergency situation.

In some embodiments, the method may comprise determining an updated location of the vehicle and transmitting the updated location to the emergency service organization.

In some embodiments, the method may comprise determining an impact associated with the vehicle.

In some embodiments, the distress signal is indicative of the determined impact being above an impact limit and the emergency service organization comprises an emergency medical service provider.

In some embodiments, the method may comprise determining a temperature associated with the vehicle.

In some embodiments, the distress signal is indicative of the detected temperature being above a temperature limit and the emergency service organization comprises a civil defense or fire department.

In some embodiments, the method may comprise selecting an emergency service organization for communication based on the determined geographic location of the vehicle. For example, the method includes determining a nearest emergency service organization based on the geographic location, and transmitting the alert notification to the nearest emergency service organization.

In some embodiments, the alert notification comprises an identity of the vehicle.

In some embodiments, the method may comprise receiving journey details associated with a trip booking of the vehicle. For example, the journey details include an identity of a passenger. In one example, the alert notification comprises the identity of the passenger.

In some embodiments, the emergency service organization is a police force.

In some embodiments, the method further comprises determining a fare of a trip.

In some embodiments, the telecommunication unit receives a payment request for paying the fare over a payment network. The telecommunication unit may further receive an authentication request and cause the payment to be authorized.

In some embodiments, the alert notification comprises a rescue request for immediate assistance by the emergency service organization.

The term "vehicle for hire" encompasses vehicles configured to be operated to offer a non-shared ride (though the vehicle itself is shared among different groups of passengers for the respective rides) with a driver, as distinct from conventional public transport systems, such as busses and subway. Vehicle for hire is also distinct from vehicles owned by private entities for exclusive and private use. The term vehicle for hire thus includes but is not limited to taxis, limousines, auto-rickshaws, carpooling or hired/chartered buses.

BRIEF DESCRIPTION OF THE DRAWINGS

Embodiments of the invention will now be described for the sake of non-limiting example only, with reference to the following drawings in which.

DETAILED DESCRIPTION

Figure 1:
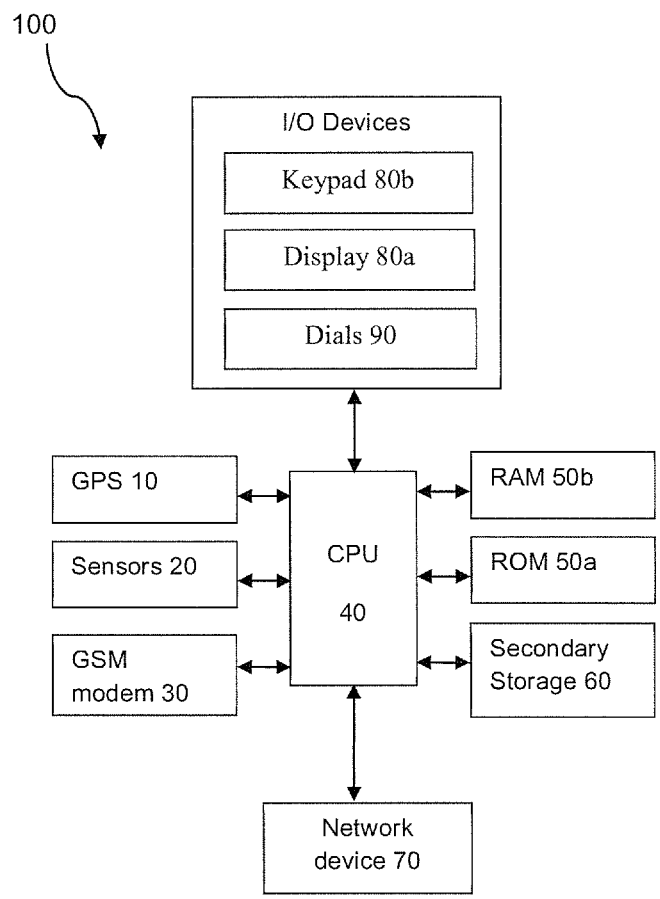
FIG. 1 is a block diagram illustrating an electronic safety system according to an embodiment.

FIG. 1 illustrates an electronic safety system 100. The electronic safety system 100 has a positioning unit such as a global positioning system (GPS) 10 and one or more sensors 20 in communication with a Global System for Mobile Communications (GSM) modem 30 via a control unit. The control unit maybe in a formed of a processor 40 (which may be referred to as a central processor unit or CPU) in communication with memory devices including secondary storage 60 (such as disk drives), read only memory (ROM) 50a, random access memory (RAM) 50b. The processor 40 may be implemented as one or more CPU chips. The safety system 100 may further comprise network connectivity devices 70 coupled to the processor 40.

In some embodiments, the electronic safety system 100 is mounted on a dashboard of a taxicab. It may further be coupled to a speed sensor of the taxicab (similar to that of a conventional taximeter) such that it may be used for determining a distance travelled by the taxicab for calculating a fare of a trip performed by the taxicab.

The GPS 10 determines a geographic location of the taxicab and stores the location on the secondary storage device 60. The geographic location may be determined at a regular time interval so that the journey history of the taxicab may be recorded and monitored. Additionally or alternatively, the geographic location is determined in response to a command by another device. For example, the GPS 10 may be commanded by the CPU 40 to determine and/or track a geographic location of the taxicab upon a detection of a distress signal by the sensor unit 20, as will be described later. The updated locations can be stored or recorded by the electronic safety system 100 for transmission to an emergency service organization. In other words, a location of the taxicab may be monitored in real time by the electronic safety system 100 and the emergency service organization as will be described later.

In some embodiments, the sensors 20 include a passenger sensor which is provided to detect an input from a passenger indicative of an emergency situation, for example, when the passenger notices abnormal behaviors exhibited by the driver such as a deviation from an estimated route, or detouring of the trip. In one embodiment, the passenger sensor is simply a button provided on the housing of the electronic safety system 100. The actuation of the button activates the passenger sensor, which is registered by processor 40 as a distress signal triggered by the passenger signaling an emergency. In another example, a plurality of passenger sensors are installed at various locations of the interior of the taxicab to detect a passenger's input. For example, a passenger sensor is provided in the vicinity of a rear seat to be accessible to a passenger seated in the rear of the taxicab. Such a passenger sensor, for example, may be arranged to be in wireless communication with the processor 40. Upon the distress signal being triggered, an alert notification is generated and transmitted to a police department notifying them of the emergency or potential emergency so as to provide relevant assistance or a rescue operation, as will be described in detail later.

In one example, the passenger sensor is configured to detect different types of passenger's input such that the alert notification is generated accordingly. In particular, when the passenger has certain safety concerns but no immediate safety threat is perceived or envisaged, the button may be actuated so that an alert notification is generated to notify the police force of a potential threat or emergency. In this case, no rescue request for immediate support is included in the alert notification. Rather, the potential emergency is brought to the police's attention, who may then monitor the situation and/or locations of the vehicles continuously. For example, the locations of the vehicles will be monitored by the electronic safety system 100 and transmitted to the police force in real time. On the other hand, upon the passenger perceiving an immediate threat, the button (or a different button) may be actuated again to allow a rescue request to be transmitted to the police force for immediate support.

In a variant, a similar sensor or button may be provided for the driver to trigger an alert notification for sending to the police when he perceives a threat from the passenger.

Additionally or alternatively, the sensors 20 include a motion sensor for determining an impact associated with the taxicab. The motion sensor may be a pressure sensor for determining an impact level (such as a magnitude of force, acceleration or shaking motion) sustained by a part of the taxicab, for example, during an impact. A distress signal is triggered for an impact above an impact limit, for example, this may be indicative of a car accident. In one example, a determination of the level of impact may be made by a motion sensor inbuilt to the vehicle (such as an impact sensor for controlling deployment of airbags of the vehicle). Accordingly, the sensors 20 are configured to receive the distress signal triggered by the inbuilt motion sensor of the vehicle. In another example, the sensors 20 include a motion sensor configured to determine an impact sustained by the electronic safety system 100 itself. It will be understood by a person skilled in the art that the motion sensor may be an accelerometer, gyroscope or any other types of motion detectors. A distress signal is triggered if a major impact associated with the vehicle is detected, and the relevant emergency service organizations such as the A&E department of a hospital may be informed by an alert notification to dispatch a medical ambulance to the corresponding location for rescue. The alert notification in this case includes a rescue request for immediate assistance by the hospital.

The sensors 20 may further include a thermal sensor for detecting a temperature of the vehicle. If the detected temperature is above a temperature limit, this may indicate that a fire emergency. Therefore, a distress signal will be triggered such that an alert notification is transmitted to a civil defense or fire department for deployment of rescue forces such as fire engines and/or medical ambulances.

In this example, the GSM modem 30 is used for sending the alert notification in a form of a text message, for example via the short message service (SMS), to the emergency service organization. The GSM may be configured to send the alert notification to a corresponding emergency service organization based on the type of the distress signal detected by the sensors 20. In other words, depending on if the distress signal is indicative of a car accident, a fire emergency and/or a safety threat to the passenger, the GSM modem 30 sends the alert notification to the respective relevant one or more emergency service organizations. The alert notification may further include an identity of the taxicab such as the vehicle plate number. It may also include an identity profile of the driver or even the passenger. Although the GSM modem 30 is given as an example of the telecommunication unit, it will be understood by a skilled person that other telecommunication units employing different communication standards or protocols may be used. For example, cellular telecommunication protocols such as code division multiple access (CDMA) or long-term evolution (LTE) may be used.

In some embodiments, the GSM modem 30 is configured to transmit the alert notification to a nearby or the nearest emergency service organization from the determined location of the taxicab. In one example, the processor 40 is configured to determine the nearest organization(s) by computing a distance between the determined location of the vehicle and locations of a plurality of emergency service organizations pre-stored in the data storage device. The stored details may further include a contact number and/or email address of the respective emergency service organizations, which can be retrieved for the modem 30 to send the alert notification. This enables emergency assistance to be provided expeditiously to the location of the emergency. It will be apparent to a skilled person that in a variant embodiment the telecommunication unit may be configured to transmit the alert notification to a centralized emergency management system, such as headquarter of the police force of a region. A corresponding emergency assistance team in the vicinity of (e.g. within a pre-defined geographic proximity to) the geographic location may then be notified and dispatched by the centralized emergency management system to perform the relevant rescue operation at the designated location.

The processor 40 executes instructions, codes, computer programs, scripts which it accesses from hard disk, floppy disk, optical disk (these various disk based systems may all be considered secondary storage 60), flash drive, ROM 50a, RAM 50b, or the network connectivity devices 70. While only one processor 40 is shown, multiple processors may be present. Thus, while instructions may be discussed as executed by a processor, the instructions may be executed simultaneously, serially, or otherwise executed by one or multiple processors.

The secondary storage 60 is typically comprised of one or more disk drives or tape drives and is used for non-volatile storage of data and as an over-flow data storage device if RAM 50b is not large enough to hold all working data. Secondary storage 60 may be used to store programs which are loaded into RAM 50b when such programs are selected for execution. In this embodiment, the secondary storage 60 stores non-transitory instructions operative by the processor 40 to cause various components of the electronic safety system 100 to coordinate to perform the method of present disclosure. The ROM 50a is used to store instructions and perhaps data which are read during program execution. The secondary storage 60, the RAM 50b, and/or the ROM 50a may be referred to in some contexts as computer readable storage media and/or non-transitory computer readable media.

The electronic safety system 100 may further include input/output devices such as display 80a, keypad 80b, dials 90, switches, track balls, voice recognizers, card readers, or other well-known input/output devices. For example, the display 80a may be liquid crystal displays (LCDs), touch screen displays or video monitors.

In some embodiments, the electronic safety system 100 may further include a network device 70 which may enable the processor 40 to communicate with the Internet or one or more intranets. The network device 70 may take the form of modems, modem banks, Ethernet cards, wireless local area network (WLAN) cards, and/or other air interface protocol radio transceiver cards, and other well-known network devices. With such a network connection, it is contemplated that the processor 40 may receive information from the network, or may output information to the network in the course of performing the above-described method operations. For example, the network device 70 allows details of a trip booking of the taxicab to be received the electronic safety system 100.

Figure 2:
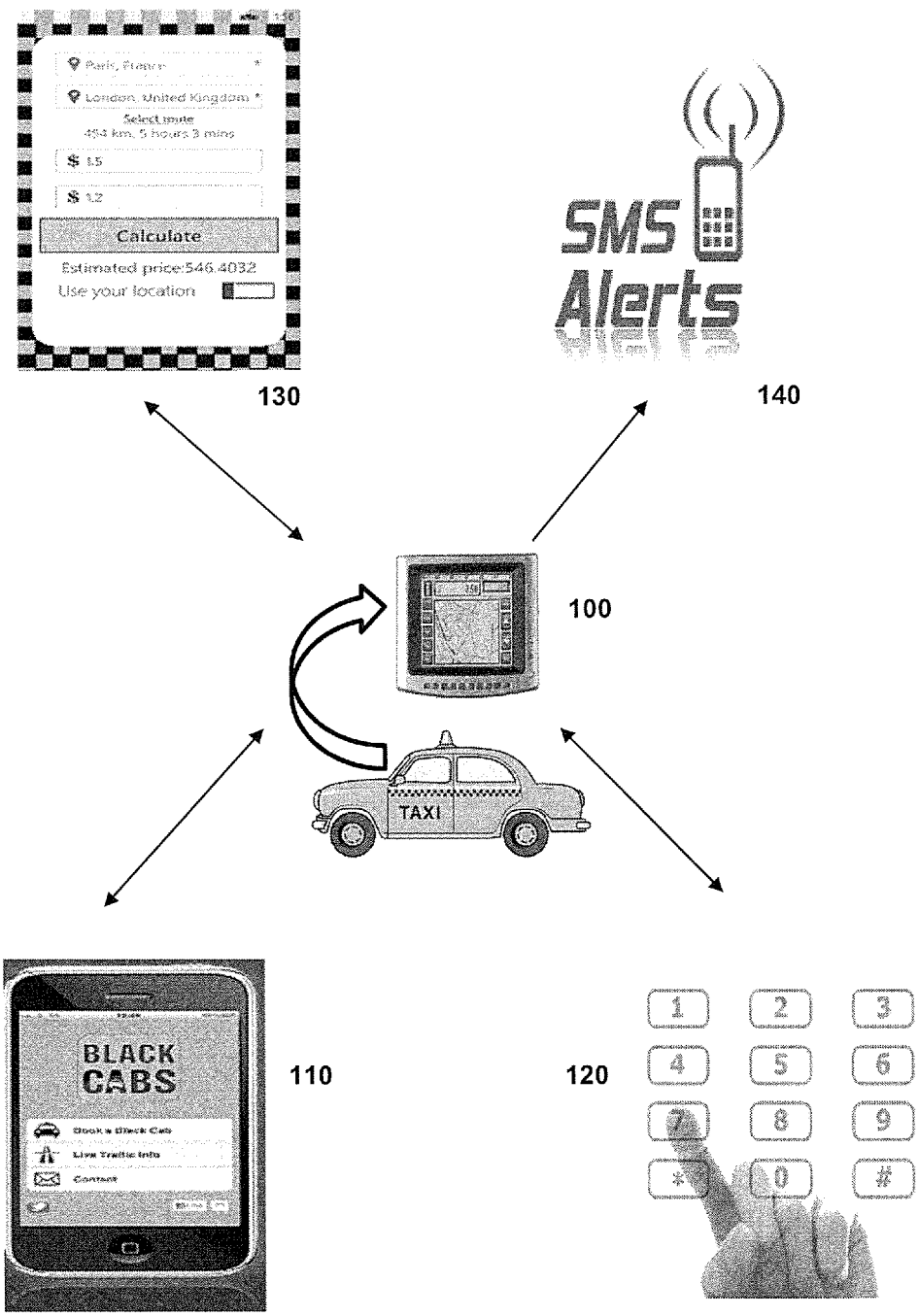
FIG. 2 is a schematic diagram illustrating a further embodiment, FIG. 3 schematically illustrates an interactive voice response (IVR) payment process which may be carried out using the electronic safety system.

As shown in FIG. 2, a trip booking may be made via a taxi booking mobile application 110 or via an interactive voice response (IVR) system 120 through the passenger's mobile phone or other devices. In this example, the secondary storage 60 has a trip management unit storing non-transitory instructions operative by the processor 40 to receive and process journey details such as an identity of a passenger, booking time, start location, destination, and/or the number of passengers. In this example, upon a distress signal being detected, the electronic safety system 100 generates an alert notification 140 which further includes some of the journey details of the trip, such as the identity of the passenger.

In the example shown in FIG. 2, the electronic safety system 100 allows a fare of the trip performed by the taxicab to be determined and displayed. Alternatively, the fare may be estimated or determined by another application 130, which may be the same as the taxi booking mobile application. The telecommunication unit may be configured to receive a payment request for paying the fare over a payment network, such as via a mobile telephony network. The payment request is associated with payment to be made via a cashless payment device such as a payment card. The payment card may be a credit card, a debit card, a prepaid card, a charge card, a membership card, a promotional card, a frequent flyer card, an identification card, a gift card. The cashless payment device may also be another device that may hold payment account information, such as a mobile phone, Smartphone, personal digital assistant (PDA), key fob, transponder device, NFC-enabled device, and/or a computer.

Figure 3:
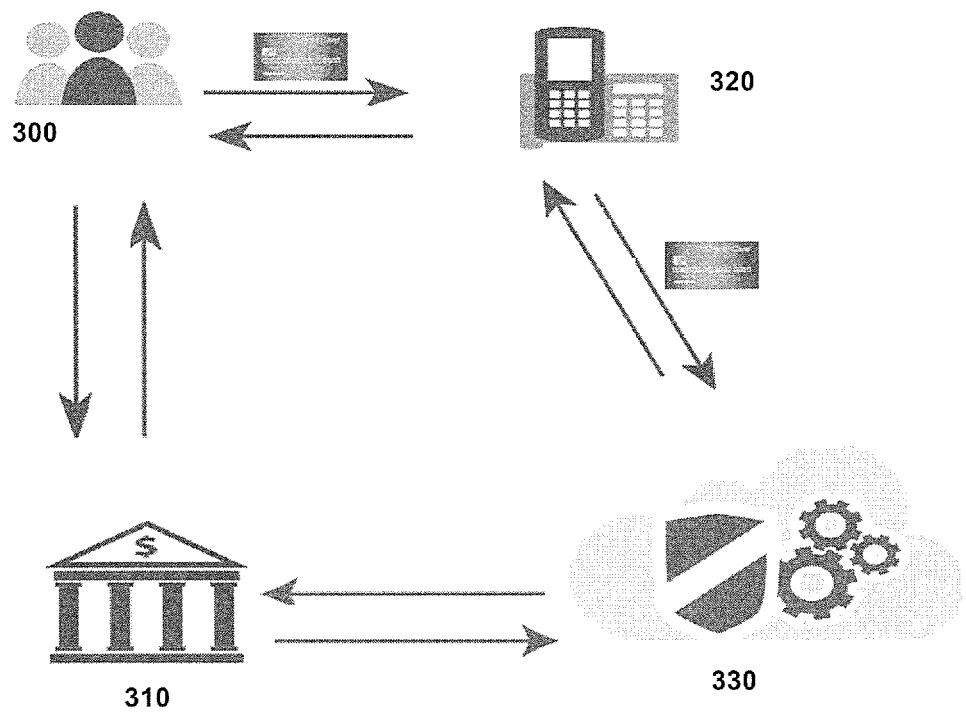

As shown in FIG. 3, the telecommunication unit is configured to communicate with a payment network 330 such that a payment request can be transmitted to the payment network 330 for effecting a payment with an issuing bank 310. For example, a passenger 300 may perform a payment via an IVR system 320 using the telecommunication unit. An authentication code is requested by the passenger for making the payment, and in response the issuing bank 310 may send the authentication code in a form of a one-time-password (OTP) to the passenger. The telecommunication unit of the electronic safety system 100 allows the authentication code to be input by the passenger 300. The IVR system 320 converts and transmitted the payment data via the payment network 330 for authorization at the issuing bank 310. The issuing bank 310 notifies the electronic safety system 100 of an outcome of the transaction through the payment network 330 and the telecommunication unit. This allows a passenger without a smart phone or a physical card to make a payment for the taxi fare. In a variant, a payment credential (such the primary account number (PAN) of the card) may be provided to the IVR directly (i.e. without providing an OTP) to effect the payment. This allows a passenger who does not carry a phone (or the like), or physical payment card to make a payment.

The payment network 330 may be any electronic payment network which connects, directly and/or indirectly payers (the customer and/or their banks or similar financial institutions) with payees (the merchants and/or their banks or similar financial institutions). Non-limiting examples of the payment network are a payment card type of network such as the payment processing network operated by MasterCard, Inc., mobile telephone payment networks and the like (it should be noted that the primary purpose of the payment network may not be payment; for example, a mobile telephony network may offer payment network capability even though its primary purpose may be mobile telephony). For example, a centralized payment network which manages payment cards issuing banks and the acquiring banks (not shown) of taxicab companies may be provided to process such payments through IVR.

In another example, a payment may be made by a mobile phone of the passenger, for example, via a software application running on the passenger's mobile phone. This may be the same application as the taxi-booking application 110 from which the trip booking was made. The payment may be made via a payment system at which the cardholder has previously registered, such as the digital or mobile wallet offered by the MasterPass™ system. In other embodiments, the payment may be made using card details which are held on file at a server with which the taxi booking application 110 is in communication. The card details and payment amount, as well as other information typically used to complete a payment transaction, may be passed from the server to a payment gateway in order to process the transaction.

Figure 4:
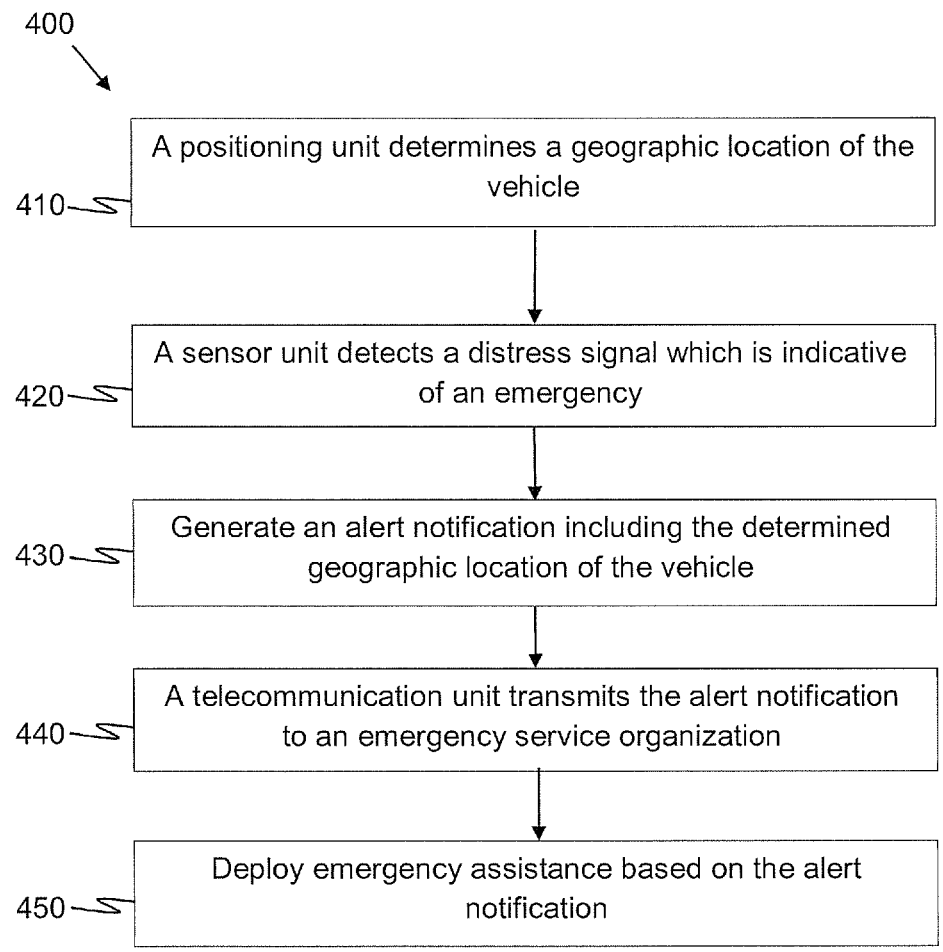
FIG. 4 is a flow diagram of a method according to an embodiment.

FIG. 4 shows an exemplary method 400 for generating an alert notification employing the electronic safety system 100. For the sake of clarity and simplicity of illustration, the steps of the method are enumerated. However, it will be understood by a person skilled in the art that the operations need not be performed in the order implied by the enumeration. For example, it would be clearly understood that the steps 410 and 420 could be performed in a reverse order, or even simultaneously.

At step 410, a geographic location of the vehicle is determined by a positioning unit such as by a GPS 10. Step 410 may be performed at a regular time interval or upon a one-off command by the CPU 40 to determine an updated location. The geographic locations may be stored in a database of the electronic safety system 100.

Upon a sensor unit detecting a distress signal at step 420, an alert notification is generated by the CPU 40 at step 430. The alert notification may be in a form of a text message or an automatic voice message conveying the geographic location of the vehicle. Typically, the alert notification is generated automatically (i.e. without requiring manual intervention by a human subject) by the CPU 40 in response to the detected distress signal. For example, the passenger and/or driver are not required to manually input the content of the message.

At step 440, a telecommunication unit transmits the alert notification generated to an emergency service organization. In one example, the telecommunication unit receives instructions from the CPU 40 to transmit the alert notification to an emergency service organization offering a particular type of emergency assistance. In another example, the CPU 40 selects a specific emergency service organization based on the geographic location of the vehicle and the type of distress signal such that the telecommunication unit transmits the alert notification to a dedicated emergency service organization. In some embodiments, the telecommunication unit may concurrently transmit the alert notification to a plurality of emergency service organizations, which may offer a same or different type of emergency assistance. At step 450, the corresponding emergency assistance is deployed based on the alert notification received. In other words, the telecommunication unit is configured to send the alert notification automatically, i.e. without requiring the passenger or driver, to initiate the transmission of the alert notification.

Whilst the foregoing description has described exemplary embodiments, it will be understood by those skilled in the art that many variations of the embodiment can be made within the scope and spirit of the present invention. For example, it will be apparent to skilled person that instead of integrating the electronic safety system to a conventional taximeter system, the fare of a taxicab may be determined by using the GPS of the electronic safety system without requiring the electronic safety system to be coupled to the speed sensor of the taxicab for distance or taxi fare calculation. For another example, the network device 70 is not required, instead, the telecommunication unit may be configured to communicate with a network, for example, to receive trip-booking details.

The invention claimed is:

1. An electronic safety system for a vehicle comprising:
a control unit having a processor;
a positioning unit located in the vehicle, operating under control of the control unit, and configured to determine a geographic location of the vehicle;
a sensor unit located in the vehicle and configured to detect a distress signal, the distress signal being determined by the control unit as being indicative of an emergency situation encountered by at least one of a passenger in the vehicle, an operator of the vehicle, and the vehicle itself; and
a telecommunication unit coupled to the positioning unit and the sensor unit, the telecommunication unit being configured to automatically transmit, in response to the distress signal detected by the sensor unit, an alert notification to an emergency service organization, the alert notification including the determined geographic location of the vehicle and the emergency service organization to which the alert notification is transmitted being determined, by the control unit, based on the determined geographic location of the vehicle and a distress signal type associated with the distress signal.

2. An electronic safety system according to claim 1, wherein the sensor unit comprises a passenger sensor configured to detect an input from a passenger indicative of an emergency situation.

3. An electronic safety system according to claim 2, wherein the passenger sensor is coupled to the telecommunication unit via a wireless communication protocol.

4. An electronic safety system according to claim 1, wherein the telecommunication unit, in cooperation with the control unit, is operable to transmit an updated location of the vehicle determined by the positioning unit.

5. An electronic safety system according to claim 1, wherein the sensor unit comprises at least one of (i) a pressure sensor configured to determine an impact associated with the vehicle and (ii) a temperature sensor to detect a temperature of the vehicle.

6. An electronic safety system according to claim 5, wherein the sensor unit comprises the pressure sensor configured to determine an impact associated with the vehicle and the distress signal is indicative of the determined impact being above an impact limit and the emergency service organization comprises an emergency medical service provider.

7. An electronic safety system according to claim 5, wherein the sensor unit comprises the temperature sensor to detect a temperature of the vehicle and the distress signal is indicative of the detected temperature being above a temperature limit and the emergency service organization comprises a civil defense department.

8. An electronic safety system according to claim 1, wherein the telecommunication unit is further configured to transmit the alert notification to a nearest emergency services organization from the geographic location of the vehicle.

9. An electronic safety system according to claim 1, wherein the alert notification comprises an identity of the vehicle.

10. An electronic safety system according to claim 1 further comprising a trip management unit located in the vehicle and configured to receive journey details associated with a trip booking of the vehicle for the passenger, said journey details including an identity of a passenger in the vehicle.

11. An electronic safety system according to claim 10, wherein the alert notification comprises the identity of the passenger.

12. An electronic safety system according to claim 1, wherein the emergency service organization is a police force.

13. An electronic safety system according to claim 1 further comprising a fare calculator configured to determine a fare of a trip.

14. An electronic safety system according to claim 13, wherein the telecommunication unit is configured to receive a payment request for paying the fare over a payment network.

15. An electronic safety system according to claim 14, wherein the telecommunication unit is configured to receive an authentication request to cause the payment to be authorized.

16. An electronic safety system according to claim 1, wherein the alert notification comprises a rescue request for immediate assistance by the emergency service organization.

17. An electronic safety system having a computer processor and a data storage device, the data storage device storing non-transitory instructions executable by the processor to:
  receive a geographic location of the vehicle from a positioning unit located in the vehicle and configured to determine a geographic location of the vehicle;
  receive data representing a distress signal from a sensor unit located in the vehicle and configured to detect a distress signal, the distress signal being determined by the processor as being indicative of an emergency situation encountered by at least one of a passenger in the vehicle, an operator of the vehicle, and the vehicle itself;
  generate, in response to the distress signal detected by the sensor unit, an alert notification including the geographic location of the vehicle; and
  cause the alert notification to be automatically transmitted, by a telecommunication unit coupled to the positioning unit and the sensor unit, to an emergency service organization in response to the distress signal, the emergency service organization to which the alert notification is transmitted being determined, by the processor, based on the determined geographic location of the vehicle and a distress signal type associated with the distress signal.

18. The electronic safety system of claim 17, wherein the computer processor and data storage device are mounted on a dashboard of a vehicle.

19. The electronic safety system of claim 18, wherein the electronic safety system is configured to couple to a speed sensor of the vehicle.

20. The electronic safety system of claim 18, wherein the sensor unit comprises a passenger sensor configured to detect an input from a passenger indicative of an emergency situation, wherein the passenger sensor is configured to be accessible to a passenger at a rear passenger seat.

21. A method of generating an alert notification via a vehicle, said vehicle having a positioning unit and a sensor unit coupled to a telecommunication unit and a control unit having a processor, the method comprising:
  determining, by the positioning unit operating under control of the control unit, a geographic location of the vehicle;
  detecting, by the sensor unit, a distress signal, the distress signal being determined by the control unit as being indicative of an emergency situation encountered by at least one of a passenger in the vehicle, an operator of the vehicle, and the vehicle itself;
  generating an alert notification including the determined geographic location of the vehicle; and
  automatically transmitting, by the telecommunication unit coupled to the positioning unit and the sensor unit, the alert notification to an emergency service organization in response to the distress signal being detected by the sensor unit, the emergency service organization to which the alert notification is transmitted being determined, by the control unit, based on the determined geographic location of the vehicle and a distress signal type associated with the distress signal.

* * * * *